(12) United States Patent
Wang et al.

(10) Patent No.: US 12,475,545 B2
(45) Date of Patent: Nov. 18, 2025

(54) METHOD FOR EVALUATING VIDEO QUALITY, ELECTRONIC DEVICE, AND STORAGE MEDIUM

(71) Applicant: Beijing Baidu Netcom Science Technology Co., Ltd., Beijing (CN)

(72) Inventors: Wei Wang, Beijing (CN); Yizhuo Liu, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 373 days.

(21) Appl. No.: 18/113,860

(22) Filed: Feb. 24, 2023

(65) Prior Publication Data
US 2024/0062351 A1   Feb. 22, 2024

(30) Foreign Application Priority Data

Aug. 16, 2022   (CN) .......................... 202210982792.1

(51) Int. Cl.
*G06T 7/00* (2017.01)
*G06T 7/90* (2017.01)
(Continued)

(52) U.S. Cl.
CPC .............. *G06T 7/0002* (2013.01); *G06T 7/90* (2017.01); *G06V 20/49* (2022.01); *H04N 9/64* (2013.01);
(Continued)

(58) Field of Classification Search
CPC ..................... G06T 7/0002; G06T 7/90; G06T 2207/10016; G06T 2207/10024;
(Continued)

(56) References Cited

U.S. PATENT DOCUMENTS

| | | | | |
|---|---|---|---|---|
| 6,026,179 A | * | 2/2000 | Brett ....................... | H04N 9/11 |
| | | | | 348/E9.04 |
| 10,402,648 B1 | * | 9/2019 | Shimozaki ........ | G06F 18/23213 |

(Continued)

FOREIGN PATENT DOCUMENTS

| | | |
|---|---|---|
| CN | 112818737 | 5/2021 |
| CN | 113033475 | 6/2021 |

(Continued)

OTHER PUBLICATIONS

First Office Action from State Intellectual Property Office of the People's Republic of China for Application No. 202210982792.1 dated Feb. 23, 2023 in 11 pages.

(Continued)

*Primary Examiner* — Timothy R Newlin
(74) *Attorney, Agent, or Firm* — Knobbe, Martens, Olson & Bear, LLP (57) ABSTRACT

Provided is a method for evaluating video quality, an electronic device and a storage medium, relating to the field of computer technology, and in particular, to the field of artificial intelligence, cloud computing, computer vision and deep learning technologies. The method includes: determining a plurality of video frames containing a target object in a target video; obtaining HSL data of an image area corresponding to the target object in the plurality of video frames; and evaluating a quality of the target video according to the HSL data.

20 Claims, 5 Drawing Sheets

(51) Int. Cl.
  *G06V 20/40* (2022.01)
  *H04N 9/64* (2023.01)
(52) U.S. Cl.
  CPC .............. *G06T 2207/10016* (2013.01); *G06T 2207/10024* (2013.01); *G06T 2207/20021* (2013.01); *G06T 2207/30168* (2013.01)
(58) Field of Classification Search
  CPC G06T 2207/20021; G06T 2207/30168; G06V 20/49; G06V 10/26; G06V 10/56; G06V 20/42; H04N 9/64; H04N 17/02; H04N 21/23418; H04N 21/44008
  See application file for complete search history.

(56) References Cited

U.S. PATENT DOCUMENTS

| | | | | |
|---|---|---|---|---|
| 11,151,386 | B1* | 10/2021 | Aggarwal | H04N 21/84 |
| 2002/0085740 | A1* | 7/2002 | Asano | G06T 7/20 |
| | | | | 382/254 |
| 2003/0002734 | A1* | 1/2003 | Islam | H04N 19/186 |
| | | | | 375/E7.04 |
| 2004/0218269 | A1* | 11/2004 | Divelbiss | H04N 13/341 |
| | | | | 348/E13.058 |
| 2007/0184373 | A1* | 8/2007 | Mertens | G06T 7/0004 |
| | | | | 430/65 |
| 2011/0032389 | A1* | 2/2011 | Miyawaki | G06T 7/0002 |
| | | | | 348/E9.053 |
| 2011/0134328 | A1* | 6/2011 | Tomioka | H04N 9/67 |
| | | | | 348/E9.037 |
| 2012/0026518 | A1* | 2/2012 | Nishizawa | G03G 15/556 |
| | | | | 358/1.9 |
| 2013/0343647 | A1* | 12/2013 | Aoki | G06T 7/90 |
| | | | | 382/165 |
| 2015/0178932 | A1* | 6/2015 | Wyatt | H04N 19/436 |
| | | | | 707/748 |
| 2017/0206427 | A1* | 7/2017 | Ginsberg | G06T 7/73 |
| 2018/0225845 | A1* | 8/2018 | Aarabi | G06T 5/94 |
| 2019/0278982 | A1* | 9/2019 | Esquivel | G06V 40/20 |
| 2020/0211172 | A1* | 7/2020 | Nam | G06T 5/70 |
| 2022/0138909 | A1* | 5/2022 | Nayak | G06T 5/50 |
| | | | | 382/255 |
| 2022/0303457 | A1* | 9/2022 | Bastide | H04N 5/2222 |
| 2022/0345769 | A1* | 10/2022 | Geng | G09G 5/001 |
| 2025/0104375 | A1* | 3/2025 | Ashikaga | G06T 19/20 |

FOREIGN PATENT DOCUMENTS

| | | |
|---|---|---|
| CN | 114339306 | 4/2022 |
| WO | WO 2020/073860 | 4/2020 |
| WO | WO 2021/217828 | 11/2021 |

OTHER PUBLICATIONS

Second Office Action from State Intellectual Property Office of the People's Republic of China for Application No. 202210982792.1 dated May 15, 2023 in 14 pages.

Seshadrinathan, Kalpana, et al., "Image Quality Assessment", ResearchGate, The Essential Guide to Image Processing. 10.1016/B978-0-12-374457-9.00021-4 (2009).

Yang, Yang, et al., "Color image quality assessment based on CIEDE2000." Advances in Multimedia 2012 (2012).

\* cited by examiner

METHOD FOR EVALUATING VIDEO QUALITY, ELECTRONIC DEVICE, AND STORAGE MEDIUM

CROSS-REFERENCE TO RELATED APPLICATIONS

The present application claims priority to Chinese Patent Application No. CN202210982792.1, filed with the China National Intellectual Property Administration on Aug. 16, 2022, the disclosure of which is hereby incorporated herein by reference in its entirety.

TECHNICAL FIELD

The present disclosure relates to the field of computer technology, and in particular, to the fields of artificial intelligence, cloud computing, computer vision and deep learning technologies.

BACKGROUND

In recent years, with the development of the internet, the video industry has attracted more people's attention, and video users have shown explosive growth. With the increasing demand, improving the viewing experience of a user has become a problem that a practitioner of the video industry needs to focus on.

SUMMARY

The present disclosure provides a method and apparatus for evaluating video quality, a system, a device and a storage medium.

According to one aspect of the present disclosure, provided is a method for evaluating video quality, including: determining a plurality of video frames containing a target object in a target video; obtaining at least HSL (hue, saturation, lightness) data of image areas corresponding to the target object in the plurality of video frames; and evaluating quality of the target video according to the HSL data.

According to another aspect of the present disclosure, provided is an apparatus for evaluating video quality, including: a determining module configured to determine a plurality of video frames containing a target object in a target video; an obtaining module configured to obtain at least HSL data of image areas corresponding to the target object in the plurality of video frames; and an evaluation module configured to evaluate quality of the target video according to the HSL data.

According to another aspect of the present disclosure, provided is an electronic device, including at least one processor; and a memory connected in communication with the at least one processor, where the memory stores an instruction executable by the at least one processor, and the instruction, when executed by the at least one processor, enables the at least one processor to execute the method of any embodiment of the present disclosure.

According to another aspect of the present disclosure, provided is a non-transitory computer-readable storage medium storing a computer instruction thereon, and the computer instruction is used to cause a computer to execute the method of any embodiment of the present disclosure.

According to another aspect of the present disclosure, provided is a computer program product including a computer program, and the computer program implements the method of any embodiment of the present disclosure, when executed by a processor.

According to the scheme of the present disclosure, evaluating the quality of the target video by using the HSL data of the target object in partial image areas of the video frames is more consistent with a perception characteristic that the human eyes usually focus on partial contents of a video when watching the video, thereby making a quality evaluation process and an evaluation result of the target video more reasonable and accurate.

It should be understood that the content described in this part is not intended to identify critical or essential features of embodiments of the present disclosure, nor is it used to limit the scope of the present disclosure. Other features of the present disclosure will be easily understood through the following description.

BRIEF DESCRIPTION OF THE DRAWINGS

The accompanying drawings are used to better understand the present solution, and do not constitute a limitation to the present disclosure.

DETAILED DESCRIPTION

Hereinafter, descriptions to embodiments of the present disclosure are made with reference to the accompanying drawings, include various details of the embodiments of the present disclosure to facilitate understanding, and should be considered as merely exemplary. Therefore, those having ordinary skill in the art should realize, various changes and modifications may be made to the embodiments described herein, without departing from the scope and spirit of the present disclosure. Likewise, for clarity and conciseness, descriptions of well-known functions and structures are omitted in the following descriptions.

Figure 1:
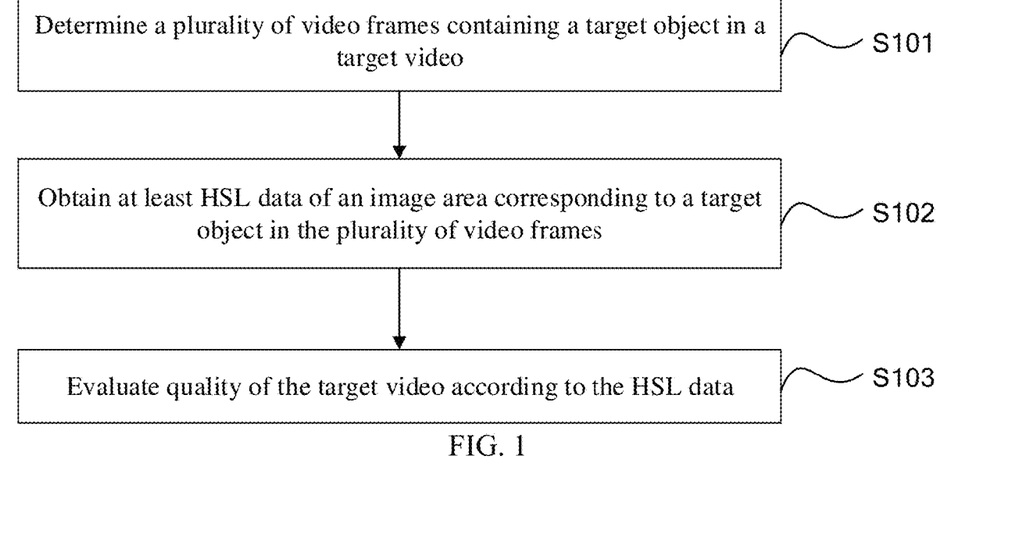
FIG. 1 is a flow schematic diagram of a method for evaluating video quality according to an embodiment of the present disclosure.

The embodiment of the present disclosure provides a method for evaluating video quality, as shown in FIG. 1, the method includes the followings.

In step S101, a plurality of video frames containing a target object in a target video is determined.

In step S102, at least HSL data of image areas corresponding to the target object in the plurality of video frames is obtained.

In step S103, quality of the target video is evaluated according to the HSL data.

According to the above embodiments of the present disclosure, it is necessary to explain the following points.

Figure 2:
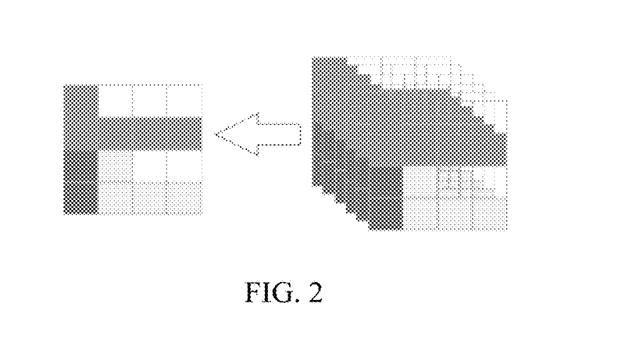
FIG. 2 is a schematic diagram of a video frame of a method for evaluating video quality according to an embodiment of the present disclosure.

The target video may be understood as a video that requires video quality evaluation. A category of the target video is not specifically limited here, for example, the target video may be a short video, a movie, a TV drama, a live video or the like. The target video is composed of several video frames (as shown in the right figure in FIG. 2), each video frame may be regarded as a static image (as shown in the left figure in FIG. 2), and playing of video contents of the target video is realized by playing the several video frames in sequence.

The target object may be understood as any person or object in playing contents of the target video. The target object may appear in each video frame of the target video, and may also enter and exit in some video frames.

The plurality of video frames containing the target object may be understood as that an image content of each video frame of the plurality of video frames contains the target object, and the contained target object may be the target object that is fully displayed or the target object that is only partially displayed. The plurality of video frames may be a plurality of video frames with continuous time or a plurality of video frames with discontinuous time intervals.

An image area corresponding to the target object in a video frame may be understood as an image area covered by the target object appearing in the video frame. The image area may be understood as a partial image area in the video frame.

HSL data may be understood as data containing a hue, saturation and a lightness. Where the hue H is measured by angle, and has a value range of 0°~360°, indicates color information, is calculated counterclockwise starting from red, that is red is 0°, green is 120°, and blue is 240°, complementary colors of which are yellow of 60°, cyan of 180°, and purple of 300°. In RGB, one color is determined by three values, for example, yellow is (255, 0, 255). In HSL, yellow is determined by only one value, which is Hue=60. The lightness L indicates a brightness of a color. A lightness of 100 indicates white, and a lightness of 0 indicates black. The saturation S indicates how close a color is to a spectral color. The higher the saturation, the darker the color, and the closer to the spectral color; the lower the saturation, the lighter the color, and the closer to white. A saturation of 0 indicates pure white. Generally, the saturation has a value range of 0%~100%, the larger the value is, the more saturated the color is. One color may be seen as a result of mixing a certain spectral color with white. Where the larger a proportion of the spectral color, the higher a degree of the color approaching the spectral color, and the higher the saturation of the color. A high saturation indicates a bright color.

Obtaining at least the HSL data of the image areas corresponding to the target object in the plurality of video frames may be understood as obtaining at least the HSL data from the image area covered by the target object displayed in each video frame of the plurality of video frames. The HSL data of the image area covered by the target object is calculated based on at least the HSL data of some pixels in the image area.

Quality evaluation includes but is not limited to evaluations of sharpness, lightness, saturation, contrast and the like of the target video, the quality of the target video may be evaluated from any evaluation dimension. Based on a quality evaluation result of the target video, the target video may be targeted for optimization.

According to the embodiment of the present disclosure, for a video frame, correlation of local information is greater than that of global information, and calculating HSL information within a range of the whole video frame is often unable to correctly describe a local hue and saturation information of a video. In addition, when watching the video, human eyes usually only focus on one certain place in the video each time, pay more attention to local data rather than global data. Therefore, using the HSL data of the target object in partial image areas of the video frames to evaluate the quality of the target video is more consistent with a perception characteristic that the human eyes usually focus on partial contents of the video when watching the video, such that a quality evaluation process and the evaluation result of the target video are more reasonable and accurate, a video staff may accurately optimize the target video based on the evaluation result, for example, may further adjust the hue, the saturation and the like of the target video to improve a user's subjective experience when watching the video.

There are mainly two methods for evaluating video quality in the prior art, one of which is a commonly used subjective video evaluation method by the human eyes, which carries on evaluation directly by an evaluator watching a video or live broadcast content played by a terminal; in this way, it is difficult to distinguish a difference between videos in a case where the videos are similar, moreover, visual fatigue caused by long time observation will affect evaluation confidence. The other method is carrying on quality evaluation based on objective quality indicators such as PSNR (Peak Signal to Noise Ratio) and SSIM (Structural Similarity). In this way, the evaluator needs to have certain professional knowledge, thus only an "expert" is suitable for evaluation. The method for evaluating video quality of the embodiment of the present disclosure effectively solves problems caused by the two existing methods for evaluating video quality, carries on objective video quality evaluation through the HSL data, instead of the methods in which the evaluator carries on subjective observation. Meanwhile, information shown by the HSL data is more intuitive, the evaluator may roughly learn the hue, the saturation and the lightness of the video according to values of the HSL data, so as to make an evaluation without professional knowledge.

In one implementation, the method for evaluating video quality according to the embodiment of the present disclosure includes the steps S101 to S103, the step S101; that is, determining the plurality of video frames containing the target object in the target video, may include the following steps.

In step S1011, a type of the target video is determined according to the video contents of the target video.

In step S1012, the target object is determined according to the type of the target video.

In step S1013, the plurality of video frames containing the target object is determined from the target video.

According to the above embodiment of the present disclosure, it is necessary to explain the following points.

The type of the target video may be understood as a video in which field the target video belongs. For example, the type of the target video may include a sports event video, a conversation and interview video, a live selling video or the like.

Figure 3:
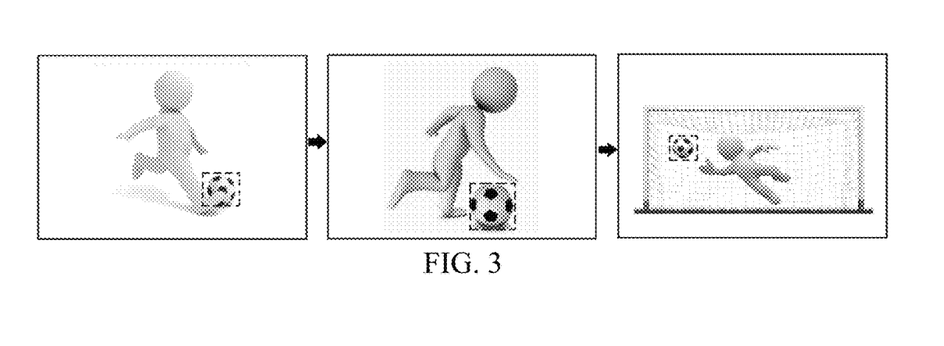
FIG. 3 is a schematic diagram of a video frame of a method for evaluating video quality according to another embodiment of the present disclosure.

Determining the target object according to the type of the target video may be understood that the determined target object needs to be associated with the type of target video. The target object is a content on which the user may easily focus when watching the target video of this type. For example, if the type of the target video is a football game video, the user will pay more attention to a moving trajectory of the football on the court than to behaviors of spectators in stands. Therefore, in a case where the type of the target video is the football game video, as shown in FIG. 3, the football (contents in dotted frames in FIG. 3) that respectively appears in three video frames shown in FIG. 3 is taken as the target object, meanwhile, video frames containing the football is used as the plurality of video frames containing the target object.

When the user is watching a video, the human eyes usually only focus on a content of one certain place in the video each time, and the focused content is usually closely related to a type of the video. For example, in the football game video, the user pays more attention to the trajectory of the football. In the live selling video, and the user pays more attention to goods themselves and the anchor. In addition, a quality of the video will be evaluated based on sharpness, a hue, saturation and other information of a focused object. According to the embodiment of the present disclosure, based on the perceptual feature that the human eyes usually only focus on one certain place of the video each time when where the user is watching the video, the type of target video is introduced as a judgment basis, which may more accurately determine the target object to which the user may pay more attention when watching the video of this type. The evaluation of the video based on the HSL data of the target object may better fit the user's perspective to evaluate the quality of the target video, such that the video staff may accurately optimize the target video based on the evaluation result, for example, may further adjust the hue, the saturation and the like of the target video to improve the user's subjective experience when watching the video.

In one implementation, the method for evaluating video quality according to the embodiment of the present disclosure at least includes the steps S101 to S103, and the steps S1011 to S1013, the step S1013, that is, determining the plurality of video frames containing the target object from the target video, may include determining the plurality of video frames containing the target object from the target video by using an image segmentation technology.

According to the embodiment of the present disclosure, it should be noted that the image segmentation technology may adopt any image segmentation method in the prior art, as long as the target object can be identified and extracted from the video frames. For example, the image segmentation technology may use equal segmentation, gray-threshold segmentation, edge segmentation and other segmentation methods. A pre-trained model may also be used to identify and extract the target object, and the specifically used model is not specifically limited here.

According to the embodiment of the present disclosure, the video frames containing the target object may be quickly and accurately determined from the target video by using the image segmentation technology.

Figure 4:
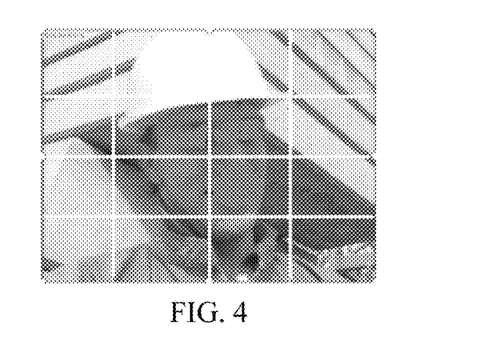
FIG. 4 is a schematic diagram of a video frame of a method for evaluating video quality according to another embodiment of the present disclosure.

In one example, as shown in FIG. 4, a video frame may be equally segmented into a plurality of image blocks using a method of equal segmentation, and then image recognition may be performed based on each image block to determine an image block with the target object.

In one implementation, the method for evaluating video quality of the embodiment of the present disclosure includes the steps S101 to S103, the step S102; that is, obtaining at least the HSL data of the image areas corresponding to the target object in the plurality of video frames, may include the following steps.

In step S1021, at least RGB data of the image areas corresponding to the target object in the plurality of video frames is obtained.

In step S1022, a data format of the RGB data is converted into a preset data format according to a bit depth and/or color depth of the RGB data.

In step S1023, the HSL data of the image areas corresponding to the target object in the plurality of video frames is obtained according to the RGB data after the converting of the data format.

According to the above embodiments of the present disclosure, it is necessary to explain that the RGB data may be understood as data including red information, green information and blue information.

The preset data format may be adjusted according to the data format of the target video. The preset data format may define a bit width when storing data, define bit widths of index bits and tail bits included in the data format, and define a conversion calculation method of a sign bit, the index bits and the tail bits in the data format during data conversion. It should be noted that the preset data format may include one or more of the sign bit, the index bits and the tail bits.

According to the embodiment of the present disclosure, the method according to the embodiment of the present disclosure may be applied more widely, satisfy the conversion of the RGB data of video frames with different data formats, by the format conversion of the RGB data. Meanwhile, it can also ensure that data precision and accuracy will not be lost during the conversion of the data format. The RGB data is data which is machine friendly and suitable for a display system. However, in the video evaluation, description of a video or an object in the video by the human eyes mainly includes "color", "whether it is bright", and "how about a degree of the brightness". Taking the RGB data is used as a video evaluation parameter will result in decrease of a reference degree thereof. Compared with the RGB data, the HSL data is a more convenient and friendly color model for human visual description. Therefore, by converting the RGB data to the HSL data, it is more intuitive and convenient for the evaluator to evaluate the quality of the target video by using the HSL data.

In one example, after determining the target object in the video frames, the segmentation method of the image area covered by the target object may be determined according to a resolution of the video frame or the target video. Then the RGB data is obtained from each segmented image block according to the segmentation method.

Figure 5:
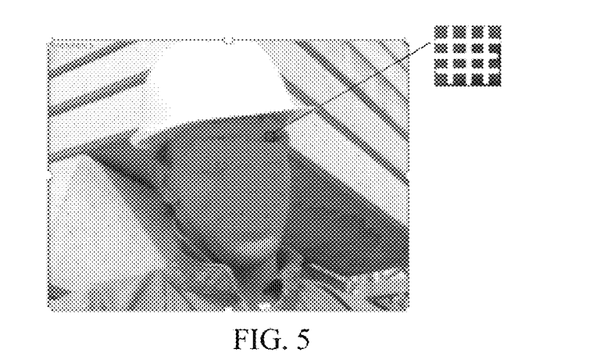
FIG. 5 is a schematic diagram of a video frame of a method for evaluating video quality according to another embodiment of the present disclosure.

Specifically, as shown in FIG. 5, after determining the target object in the video frame, it is determined that each segmented image block is a matrix of 4*4 pixels according to the resolution of the video frame or the target video, and the image area covered by the target object is segmented based on this matrix, RGB data of each image block is calculated based on the sixteen pixels contained in each image block, and then the RGB data of the image area covered by the target object is calculated based on the RGB data of each image block.

In one example, the RGB data can be converted to the HSL data by the following formulas:

$$R' = \frac{R}{255}; G' = \frac{G}{255}; B' = \frac{B}{255};$$

$C_{max}$=max(R', G', B'); $C_{min}$=min(R', G', B'); and $\Delta = C_{max} - C_{min}$.

Conversion formula of the hue H is:

$$H = \begin{cases} 0° & , \Delta = 0 \\ 60° \times \left(\frac{G'-B'}{\Delta} \bmod 6\right) & , C_{max} = R' \\ 60° \times \left(\frac{G'-B'}{\Delta} + 2\right) & , C_{max} = G' \\ 60° \times \left(\frac{G'-B'}{\Delta} + 4\right) & , C_{max} = B' \end{cases}$$

Conversion formula of the saturation S is:

$$S = \begin{cases} 0 & , \Delta = 0 \\ \frac{\Delta}{1 - |2L - 1|} & , \Delta <> 0 \end{cases}.$$

Conversion formula of the lightness L is:

$$L = \frac{(C_{max} + C_{min})}{2}.$$

Where, R is red information of the image area corresponding to the target image after the conversion of the data format, G is green information of the image area corresponding to the target image after the conversion of the data format, B is blue information of the image area corresponding to the target image after the conversion of the data format. $C_{max}$ is RGB data of the maximum value in the image area corresponding to the target image, $C_{min}$ is RGB data of the minimum value in the image area corresponding to the target image, $\Delta$ is the difference between the RGB data of the maximum value and the RGB data of the minimum value in the image area corresponding to the target image.

In one example, HSL data of each pixel or each image block in the target area corresponding to the target object may be represented in the form of a matrix:

$$H = \begin{bmatrix} H_{00} & \cdots & H_{0j} \\ \vdots & \ddots & \vdots \\ H_{k0} & \cdots & H_{kj} \end{bmatrix}; L = \begin{bmatrix} L_{00} & \cdots & L_{0j} \\ \vdots & \ddots & \vdots \\ L_{k0} & \cdots & L_{kj} \end{bmatrix}; \text{ and } S = \begin{bmatrix} S_{00} & \cdots & S_{0j} \\ \vdots & \ddots & \vdots \\ S_{k0} & \cdots & S_{kj} \end{bmatrix}.$$

H represents hue data, L represents lightness data, and S represents saturation data. $H_{00}$-$H_{kj}$ represents the hue data of each pixel or each image block in the target area corresponding to the target object, $L_{00}$-$L_{kj}$ represents the lightness data of each pixel or each image block in the target area corresponding to the target object, $S_{00}$-$S_{kj}$ represents the saturation data of each pixel or each image block in the target area corresponding to the target object.

Figure 6:
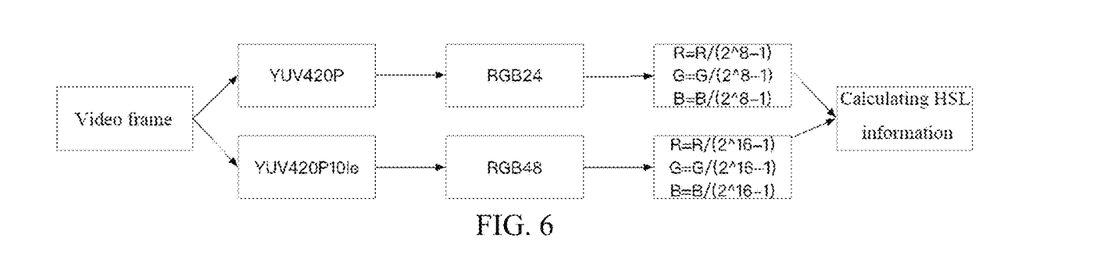
FIG. 6 is a schematic diagram of data format conversion of a method for evaluating video quality according to the embodiment of the present disclosure.

In one example, as shown in FIG. 6, there are different storage formats for a video, such as a YUV420P storage format, a YUV420P101e storage format, and the like. For the YUV420P format, each color channel is represented by 8 bits (Binary digit), which is consistent with color channels of RGB24 (in which each color channel is represented by 8 bits). However, for YUV420P101e, each of Y, U and V components is represented by 10 bits, and 16 bits are used for storage convenience. If 10 bits YUV data is directly converted to 8 bits RGB data, and then a HSL value is calculated, calculation accuracy will be lost. For convenience of calculation, in the embodiment of the present disclosure, YUV420P101e data is converted into data in a RGB48 format, and then HSL information of 10 bits color depth video is calculated through the data in the RGB48 format.

In one implementation, the method for evaluating video quality of the embodiment of the present disclosure at least includes the steps S101 to S103, and the steps S1021 to S1023, the step S1021, that is, obtaining at least the RGB data of the image areas corresponding to the target object in the plurality of video frames, includes obtaining at least YUV data of the image areas corresponding to the target object in the plurality of video frames, and obtaining the RGB data of the image areas corresponding to the target object in the plurality of video frames according to the YUV data.

According to the above embodiment of the present disclosure, it is necessary to explain that the YUV data is obtained by decoding the plurality of video frames of the target video. The YUV data includes "Y" data indicating Luminance or Luma, that is, a grayscale value, "U" and "V" indicate data of Chrominance or Chroma. The "U" and "V" are used to describe an image color and the saturation, and are used to specify colors of the pixels.

A method of converting the YUV data to the RGB data may adopt any conversion method in the prior art, which is not specifically limited here.

According to the embodiment of the present disclosure, the RGB data of the image areas corresponding to the target object in the plurality of video frames may be accurately obtained by using the YUV data of the image areas corresponding to the target object in the plurality of video frames.

In one implementation, the method for evaluating video quality of the embodiment of the present disclosure at least includes the steps S101 to S103, the step S103, that is evaluating the quality of the target video according to the HSL data, includes obtaining an average value of the HSL data according to a quantity of the plurality of video frames, and evaluating the quality of the target video according to the average value and a HSL evaluation threshold.

According to the above embodiment of the present disclosure, it is necessary to explain that the HSL evaluation threshold may be selected and adjusted as required. The HSL evaluation threshold is used as a benchmark for evaluating the quality of the video.

According to the embodiment of the present disclosure, the quality of the target video is accurately evaluated by using the HSL evaluation threshold and the average value of the HSL data.

In one implementation, the method for evaluating video quality of the embodiment of the present disclosure includes at least the steps S101 to S103, and also includes respectively associating the plurality of video frames with corresponding HSL data and displaying association relationships in a visualization manner. The visualization manner includes a data log and/or a grayscale image.

According to the above embodiment of the present disclosure, it is necessary to explain that respectively associating the plurality of video frames with the corresponding HSL data and displaying association relationships in the visualization manner may be understood that when viewing a corresponding video frame, the HSL data of the video frame will be displayed in real time.

Figure 7:
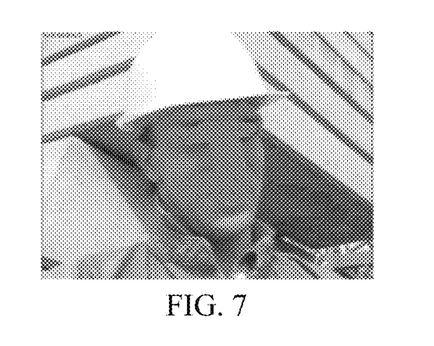
FIG. 7 is a schematic diagram of a grayscale image of a method for evaluating video quality according to an embodiment of the present disclosure.
Figure 8:
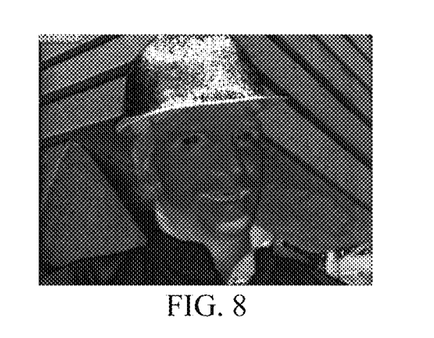
FIG. 8 is a schematic diagram of a grayscale image of a method for evaluating video quality according to another embodiment of the present disclosure.
Figure 9:
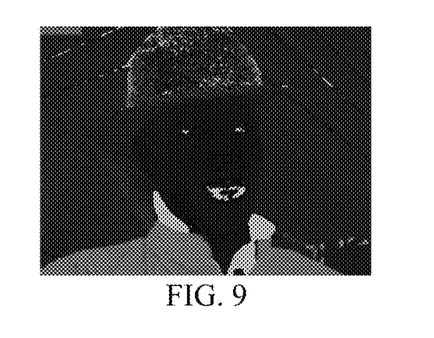
FIG. 9 is a schematic diagram of a grayscale image of a method for evaluating video quality according to another embodiment of the present disclosure.

In a case where the visualization mode is the grayscale image, three components of the HSL data may be displayed as different grayscale images respectively. As shown in FIG. 7, it is a grayscale image of a saturation S component. As shown in FIG. 8, it is a grayscale image of a lightness L component. As shown in FIG. 9, it is a grayscale image of a hue H component.

According to the embodiment of the present disclosure, in a case where the evaluator carries on the video evaluation and scoring, the HSL data of the plurality of video frames is displayed visually, which may facilitate the evaluator to understand "color" related information, "whether it is bright" related information, and "the degree of the brightness" related information of the target video and/or the video frames, that is, parameters under a HSL color model.

Figure 10:
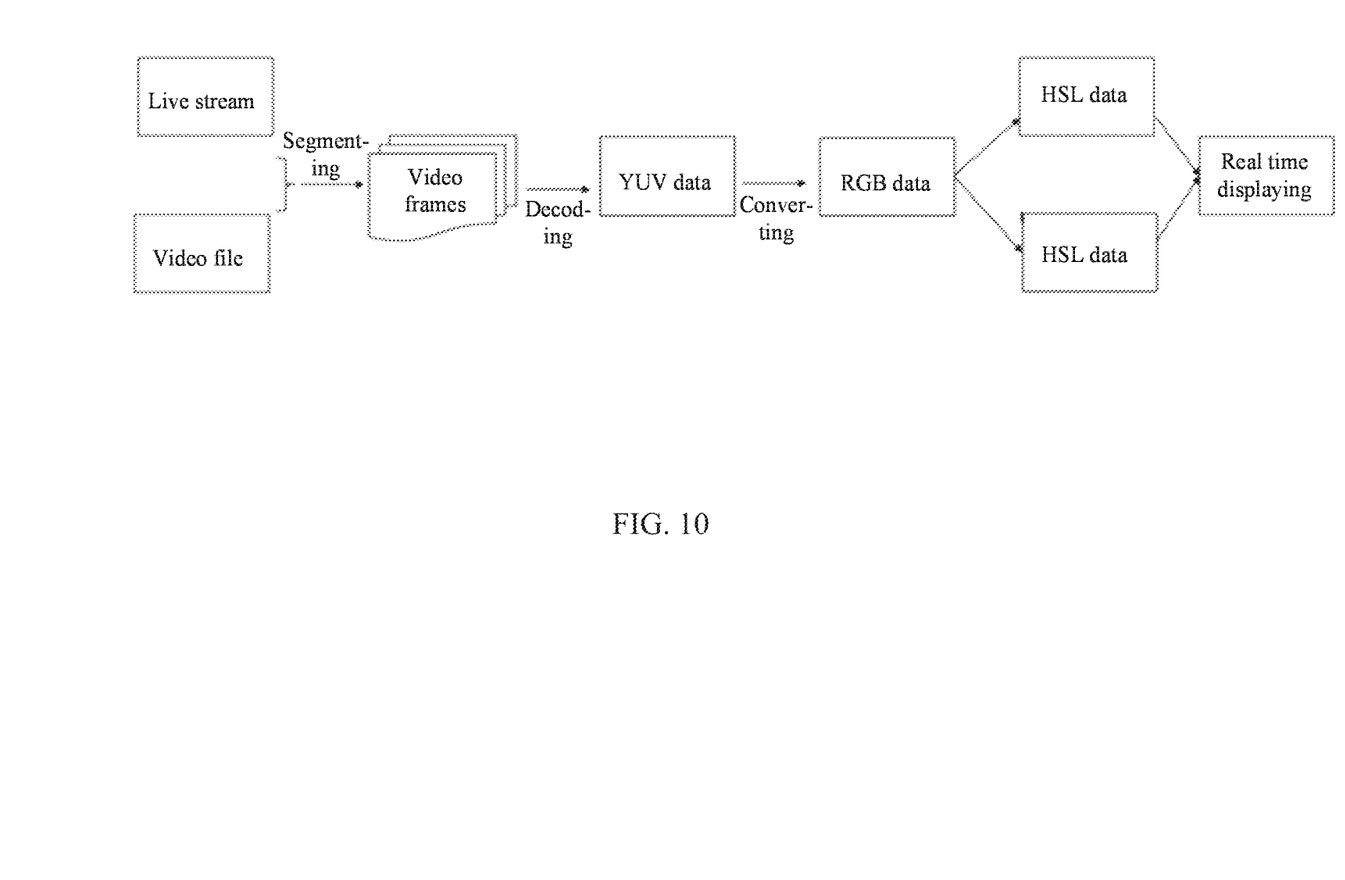
FIG. 10 is a flow diagram of a method for evaluating video quality according to another embodiment of the present disclosure.

In one embodiment, as shown in FIG. 10, the method for evaluating video quality includes segmenting the target video (a video file and/or a live stream) into the plurality of video frames, each of which contains the target object; obtaining at least the YUV data of the image areas corresponding to the target object in the plurality of video frames by decoding the plurality of video frames; obtaining the RGB data of the image areas corresponding to the target object in the plurality of video frames according to the YUV data; converting the data format of the RGB data with different bit widths to the preset data format according to the bit depth and/or color depth of the RGB data; obtaining the HSL data of the image areas corresponding to the target object in the plurality of video frames according to the RGB data after the conversion of the data format; and respectively associating the plurality of video frames with the corresponding HSL data and displaying association relationships in the visualization manner.

Figure 11:
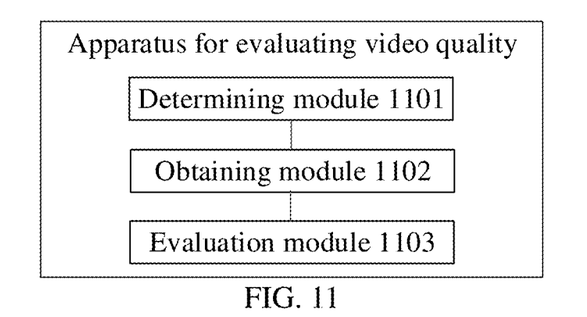
FIG. 11 is a structural diagram of an apparatus for evaluating video quality according to an embodiment of the present disclosure.

The embodiment of the present disclosure provides an apparatus for evaluating video quality, and as shown in FIG. 11, the apparatus includes the following modules.

A determining module 1101 is configured to determine the plurality of video frames containing the target object in the target video.

An obtaining module 1102 is configured to obtain at least the HSL data of the image areas corresponding to the target object in the plurality of video frames.

An evaluation module 1103 is configured to evaluate the quality of the target video according to the HSL data.

In one implementation, the determining module 1101 includes a first determining sub-module configured to determine the type of the target video according to the video contents of the target video, a second determining sub-module configured to determine the target object according to the type of the target video, and a third determination sub-module configured to determine the plurality of video frames containing the target object from the target video.

In one implementation, the third determining sub-module is further configured to determine the plurality of video frames containing the target object from the target video by using the image segmentation technology.

In one implementation, the obtaining module 1102 includes a first obtaining sub-module configured to obtain at least the RGB data of the image areas corresponding to the target object in the plurality of video frames, a conversion sub-module configured to convert the data format of the RGB data into the preset data format according to the bit depth and/or color depth of the RGB data, and a second obtaining sub-module configured to obtain the HSL data of the image areas corresponding to the target object in the plurality of video frames according to the RGB data after the conversion of the data format.

In one implementation, the first obtaining sub-module is further configured to obtain at least the YUV data of the image areas corresponding to the target object in a plurality of video frames, and obtaining the RGB data of the image areas corresponding to the target object in the plurality of video frames according to the YUV data.

In one implementation, the evaluation module 1103 includes a third obtaining sub-module configured to obtain the average value of the HSL data according to the quantity of the plurality of video frames, and an evaluation sub-module configured to evaluate the quality of the target video according to the average value and the HSL evaluation threshold.

In one implementation, the apparatus for evaluating video quality further includes a visualization module configured to respectively associate the plurality of video frames with the corresponding HSL data and display association relationships in the visualization manner. The visualization manner includes the data log and/or the grayscale image.

Descriptions of specific functions and examples of each module and each sub-module of the apparatus according to the embodiment of the present disclosure may refer to the relevant descriptions of the corresponding steps in the above method embodiment, and will not be repeated here.

In the technical solution of the present disclosure, obtaining, storage and application of the user's personal information involved are all in compliance with provisions of relevant laws and regulations, and do not violate public order and good customs.

According to the embodiment of the present disclosure, the present disclosure also provides an electronic device, a readable storage medium and a computer program product.

Figure 12:
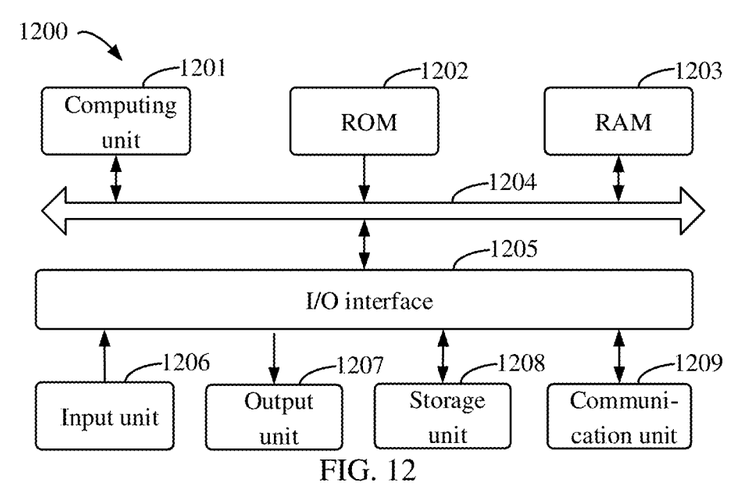
FIG. 12 is a block diagram of an electronic device used to implement a method for evaluating video quality according to an embodiment of the present disclosure.

FIG. 12 shows a schematic block diagram of an exemplary electronic device 1200 that may be used to implement the embodiment of the present disclosure. The electronic device is intended to represent various forms of digital computers, such as a laptop, a desktop, a workstation, a personal digital assistant, a server, a blade server, a mainframe computer, and other suitable computers. The electronic device may also represent various forms of mobile devices, such as a personal digital processing, a cellular phone, a smart phone, a wearable device and other similar computing devices. The components shown herein, their connections and relationships, and their functions are merely examples, and are not intended to limit the implementation of the present disclosure described and/or required herein.

As shown in FIG. 12, the device 1200 includes a computing unit 1201 that may perform various appropriate actions and processes according to a computer program stored in a Read-Only Memory (ROM) 1202 or a computer program loaded from a storage unit 1208 into a Random Access Memory (RAM) 1203. Various programs and data required for an operation of device 1200 may also be stored in the RAM 1203. The computing unit 1201, the ROM 1202 and the RAM 1203 are connected to each other through a bus 1204. The input/output (I/O) interface 1205 is also connected to the bus 1204.

A plurality of components in the device 1200 are connected to the I/O interface 1205, and include an input unit 1206 such as a keyboard, a mouse, or the like; an output unit 1207 such as various types of displays, speakers, or the like; the storage unit 1208 such as a magnetic disk, an optical disk, or the like; and a communication unit 1209 such as a network card, a modem, a wireless communication transceiver, or the like. The communication unit 1209 allows the device 1200 to exchange information/data with other devices through a computer network such as the Internet and/or various telecommunication networks.

The computing unit 1201 may be various general-purpose and/or special-purpose processing components with processing and computing capabilities. Some examples of the computing unit 1201 include, but are not limited to, a Central Processing Unit (CPU), a Graphics Processing Unit (GPU), various dedicated Artificial Intelligence (AI) computing chips, various computing units that run machine learning model algorithms, a Digital Signal Processor (DSP), and any appropriate processors, controllers, microcontrollers, or the like. The computing unit 1201 performs various methods and processing described above, such as the above method for evaluating video quality. For example, in some implementations, the above method for evaluating video quality may be implemented as a computer software program tangibly contained in a computer-readable medium, such as the storage unit 1208. In some implementations, a part or all of the computer program may be loaded and/or installed on the device 1200 via the ROM 1202 and/or the communication unit 1209. When the computer program is loaded into RAM 1203 and executed by the computing unit 1201, one or more steps of the method for evaluating video quality described above may be performed. Alternatively, in other implementations, the computing unit 1201 may be configured to perform the above method for evaluating video quality by any other suitable means (e.g., by means of firmware).

Various implements of the system and technologies described above herein may be implemented in a digital electronic circuit system, an integrated circuit system, a Field Programmable Gate Array (FPGA), an Application Specific Integrated Circuit (ASIC), Application Specific Standard Parts (ASSP), a System on Chip (SOC), a Complex Programmable Logic Device (CPLD), a computer hardware, firmware, software, and/or a combination thereof. These various implementations may be implemented in one or more computer programs, and the one or more computer programs may be executed and/or interpreted on a programmable system including at least one programmable processor. The programmable processor may be a special-purpose or general-purpose programmable processor, may receive data and instructions from a storage system, at least one input device, and at least one output device, and transmit the data and the instructions to the storage system, the at least one input device, and the at least one output device.

The program code for implementing the method of the present disclosure may be written in any combination of one or more programming languages. The program code may be provided to a processor or controller of a general-purpose computer, a special-purpose computer or other programmable data processing devices, which enables the program code, when executed by the processor or controller, to cause the function/operation specified in the flowchart and/or block diagram to be implemented. The program code may be completely executed on a machine, partially executed on the machine, partially executed on the machine as a separate software package and partially executed on a remote machine, or completely executed on the remote machine or a server.

In the context of the present disclosure, a machine-readable medium may be a tangible medium, which may contain or store a procedure for use by or in connection with an instruction execution system, device or apparatus. The machine-readable medium may be a machine-readable signal medium or a machine-readable storage medium. The machine-readable medium may include, but is not limited to, an electronic, magnetic, optical, electromagnetic, infrared or semiconductor system, device or apparatus, or any suitable combination thereof. More specific examples of the machine-readable storage medium may include electrical connections based on one or more lines, a portable computer disk, a hard disk, a Random Access Memory (RAM), a Read-Only Memory (ROM), an Erasable Programmable Read-Only Memory (EPROM or a flash memory), an optical fiber, a portable Compact Disc Read-Only Memory (CD-ROM), an optical storage device, a magnetic storage device, or any suitable combination thereof.

In order to provide interaction with a user, the system and technologies described herein may be implemented on a computer that has: a display apparatus (e.g., a cathode ray tube (CRT) or a Liquid Crystal Display (LCD) monitor) for displaying information to the user; and a keyboard and a pointing device (e.g., a mouse or a trackball) through which the user may provide input to the computer. Other types of devices may also be used to provide interaction with the user. For example, feedback provided to the user may be any form of sensory feedback (e.g., visual feedback, auditory feedback, or tactile feedback), and the input from the user may be received in any form (including an acoustic input, a voice input, or a tactile input).

The system and technologies described herein may be implemented in a computing system (which serves as, for example, a data server) including a back-end component, or in a computing system (which serves as, for example, an application server) including a middleware, or in a computing system including a front-end component (e.g., a user computer with a graphical user interface or web browser through which the user may interact with the implementation of the system and technologies described herein), or in a computing system including any combination of the back-end component, the middleware component, or the front-end component. The components of the system may be connected to each other through any form or kind of digital data communication (e.g., a communication network). Examples of the communication network include a Local Area Network (LAN), a Wide Area Network (WAN), and the Internet.

A computer system may include a client and a server. The client and server are generally far away from each other and usually interact with each other through a communication network. A relationship between the client and the server is generated by computer programs running on corresponding computers and having a client-server relationship with each other. The server may be a cloud server, a distributed system server, or a blockchain server.

It should be understood that the steps may be reordered, added or removed by using the various forms of the flows described above. For example, the steps recorded in the present disclosure can be performed in parallel, in sequence, or in different orders, as long as a desired result of the technical scheme disclosed in the present disclosure can be realized, which is not limited herein.

The foregoing specific implementations do not constitute a limitation on the scope of the present disclosure. Those having skill in the art should understand that various modifications, combinations, sub-combinations and substitutions may be made. Any modification, equivalent replacement, improvement or the like made within the spirit and principle of the present disclosure shall be included in the scope of the present disclosure.

What is claimed is:

1. A method for evaluating video quality, comprising:
   determining a plurality of video frames containing a target object in a target video;
   obtaining at least HSL data of an image area corresponding to the target object in the plurality of video frames;
   evaluating quality of the target video according to the HSL data;
   associating the plurality of video frames with corresponding HSL data respectively; and
   displaying an association relationship in a visualization manner, wherein the visualization manner comprises a data log and/or a grayscale image.

2. The method of claim 1, wherein determining the plurality of video frames containing the target object in the target video comprises:
   determining a type of the target video according to video contents of the target video;
   determining the target object according to the type of the target video; and
   determining the plurality of video frames containing the target object from the target video.

3. The method of claim 2, wherein determining the plurality of video frames containing the target object from the target video comprises:
   determining the plurality of video frames containing the target object from the target video by using an image segmentation technology.

4. The method of claim 1, wherein obtaining at least the HSL data of the image area corresponding to the target object in the plurality of video frames comprises:
   obtaining at least RGB data of the image area corresponding to the target object in the plurality of video frames;
   converting a data format of the RGB data into a preset data format according to a bit depth and/or color depth of the RGB data; and
   obtaining the HSL data of the image area corresponding to the target object in the plurality of video frames according to the RGB data after converting the data format.

5. The method of claim 2, wherein obtaining at least the HSL data of the image area corresponding to the target object in the plurality of video frames comprises:
   obtaining at least RGB data of the image area corresponding to the target object in the plurality of video frames;
   converting a data format of the RGB data into a preset data format according to a bit depth and/or color depth of the RGB data; and
   obtaining the HSL data of the image area corresponding to the target object in the plurality of video frames according to the RGB data after converting the data format.

6. The method of claim 3, wherein obtaining at least the HSL data of the image area corresponding to the target object in the plurality of video frames comprises:
   obtaining at least RGB data of the image area corresponding to the target object in the plurality of video frames;
   converting a data format of the RGB data into a preset data format according to a bit depth and/or color depth of the RGB data; and
   obtaining the HSL data of the image area corresponding to the target object in the plurality of video frames according to the RGB data after converting the data format.

7. The method of claim 4, wherein obtaining at least the RGB data of the image area corresponding to the target object in the plurality of video frames comprises:
   obtaining at least YUV data of the image area corresponding to the target object in the plurality of video frames; and
   obtaining the RGB data of the image area corresponding to the target object in the plurality of video frames according to the YUV data.

8. The method of claim 5, wherein obtaining at least the RGB data of the image area corresponding to the target object in the plurality of video frames comprises:
   obtaining at least YUV data of the image area corresponding to the target object in the plurality of video frames; and
   obtaining the RGB data of the image area corresponding to the target object in the plurality of video frames according to the YUV data.

9. The method of claim 6, wherein obtaining at least the RGB data of the image area corresponding to the target object in the plurality of video frames comprises:
   obtaining at least YUV data of the image area corresponding to the target object in the plurality of video frames; and
   obtaining the RGB data of the image area corresponding to the target object in the plurality of video frames according to the YUV data.

10. The method of claim 1, wherein evaluating the quality of the target video according to the HSL data comprises:
    obtaining an average value of the HSL data according to a quantity of the plurality of video frames; and
    evaluating the quality of the target video according to the average value and a HSL evaluation threshold.

11. The method of claim 2, wherein evaluating the quality of the target video according to the HSL data comprises:
    obtaining an average value of the HSL data according to a quantity of the plurality of video frames; and
    evaluating the quality of the target video according to the average value and a HSL evaluation threshold.

12. The method of claim 3, wherein evaluating the quality of the target video according to the HSL data comprises:
    obtaining an average value of the HSL data according to a quantity of the plurality of video frames; and
    evaluating the quality of the target video according to the average value and a HSL evaluation threshold.

13. An electronic device, comprising:
    at least one processor; and
    a memory connected in communication with the at least one processor;
    wherein the memory stores an instruction executable by the at least one processor to enable the at least one processor to execute operations, comprising:
    determining a plurality of video frames containing a target object in a target video;
    obtaining at least HSL data of an image area corresponding to the target object in the plurality of video frames;
    evaluating quality of the target video according to the HSL data;
    associating the plurality of video frames with corresponding HSL data respectively; and
    displaying an association relationship in a visualization manner, wherein the visualization manner comprises a data log and/or a grayscale image.

14. The electronic device of claim 13, wherein determining the plurality of video frames containing the target object in the target video comprises:
- determining a type of the target video according to video contents of the target video;
- determining the target object according to the type of the target video; and
- determining the plurality of video frames containing the target object from the target video.

15. The electronic device of claim 14, wherein determining the plurality of video frames containing the target object from the target video comprises:
- determining the plurality of video frames containing the target object from the target video by using an image segmentation technology.

16. The electronic device of claim 13, wherein obtaining at least the HSL data of the image area corresponding to the target object in the plurality of video frames comprises:
- obtaining at least RGB data of the image area corresponding to the target object in the plurality of video frames;
- converting a data format of the RGB data into a preset data format according to a bit depth and/or color depth of the RGB data; and
- obtaining the HSL data of the image area corresponding to the target object in the plurality of video frames according to the RGB data after converting the data format.

17. The electronic device of claim 13, wherein evaluating the quality of the target video according to the HSL data comprises:
- obtaining an average value of the HSL data according to a quantity of the plurality of video frames; and
- evaluating the quality of the target video according to the average value and a HSL evaluation threshold.

18. A non-transitory computer-readable storage medium storing a computer instruction thereon, wherein the computer instruction is used to cause a computer to execute operations, comprising:
- determining a plurality of video frames containing a target object in a target video;
- obtaining at least HSL data of an image area corresponding to the target object in the plurality of video frames;
- evaluating quality of the target video according to the HSL data;
- associating the plurality of video frames with corresponding HSL data respectively; and
- displaying an association relationship in a visualization manner, wherein the visualization manner comprises a data log and/or a grayscale image.

19. The non-transitory computer-readable storage medium of claim 18, wherein determining the plurality of video frames containing the target object in the target video comprises:
- determining a type of the target video according to video contents of the target video;
- determining the target object according to the type of the target video; and
- determining the plurality of video frames containing the target object from the target video.

20. The non-transitory computer-readable storage medium of claim 19, wherein determining the plurality of video frames containing the target object from the target video comprises:
- determining the plurality of video frames containing the target object from the target video by using an image segmentation technology.

* * * * *